United States Patent [19]

Zander et al.

[11] Patent Number: 5,232,175
[45] Date of Patent: Aug. 3, 1993

[54] AIRTIGHT SEAL/USE INDICATOR FOR A FILM CARTRIDGE

[75] Inventors: Dennis R. Zander, Penfield; Douglas M. Csaszar, Williamson; Eugene Sisto, Rochester, all of N.Y.

[73] Assignee: Eastman Kodak Company, Rochester, N.Y.

[21] Appl. No.: 859,787

[22] Filed: Mar. 30, 1992

[51] Int. Cl.⁵ .................................................. G03B 17/26
[52] U.S. Cl. .................................... 242/71.1; 354/275
[58] Field of Search ............... 242/71.1, 71.2, 71.8, 242/197; 354/275

[56] References Cited

U.S. PATENT DOCUMENTS

| | | | |
|---|---|---|---|
| 1,528,128 | 3/1925 | Peterson | 242/71.8 |
| 2,458,383 | 1/1949 | Isaac | 242/71.8 |
| 3,620,475 | 11/1971 | Penn | 242/197 |
| 4,058,823 | 11/1977 | Mitchell et al. | 354/275 X |
| 4,514,070 | 4/1985 | Norris | 354/275 |
| 4,630,915 | 12/1986 | Whiteside et al. | 354/275 |
| 4,647,170 | 3/1987 | Stoneham | 242/71.1 X |
| 4,682,870 | 7/1987 | Atkinson | 354/275 |
| 5,032,862 | 7/1991 | Behnke | 354/275 |

FOREIGN PATENT DOCUMENTS 564087 9/1944 United Kingdom ............... 242/71.1

Primary Examiner—John M. Jillions
Attorney, Agent, or Firm—Roger A. Fields

[57] ABSTRACT

In a film cartridge, a spool hub has a coaxial cavity in one end portion. A cartridge housing for the spool hub has a hole in one end wall that is aligned with the cavity to permit access to the cavity through the hole. A hermetic plug is sized to fit tightly in the hole to act as an airtight seal for the hole, but is sufficiently compliant to permit it to be forcibly pushed intact from the hole into the cavity to provide a visible indication that the film cartridge has been used.

4 Claims, 2 Drawing Sheets

AIRTIGHT SEAL/USE INDICATOR FOR A FILM CARTRIDGE

BACKGROUND OF THE INVENTION

1. Field of the Invention

The invention relates generally to the field of photography, and in particular to film cartridges. More specifically, the invention relates to an alternative airtight seal and use indicator for a film cartridge.

2. Description of the Prior Art

It is known as disclosed in commonly assigned U.S. Pat. No. 4,647,170, issued Mar. 3, 1987, to provide a conventional 35 mm film cartridge with a compressible plug which can be pushed inwardly within the coaxial cavity at one end portion of the hub of the film spool to indicate the film cartridge has been used. The end portion of the hub extends through a coaxial opening in the cartridge housing to the outside of the housing.

Also, U.S. Pat. No. 5,032,862, issued Jul. 16, 1991, discloses a similar 35 mm cartridge in which the cavity in the end portion of the hub is covered with a disk-shaped label that can be pierced to indicate the film cartridge has been used. A problem with the label is that it may leave debris when pierced.

SUMMARY OF THE INVENTION

According to the invention, a film cartridge comprises:

a spool hub including an end portion having a coaxial cavity;

a cartridge housing for the spool hub including an end wall having a hole aligned with the cavity to permit access to the cavity through said hole;

a hermetic plug sized to fit tightly in the hole to act as an airtight seal for the hole, but sufficiently compliant to permit it to be forcibly pushed intact from the hole into the cavity to provide a visible indication that the film cartridge has been used.

DETAILED DESCRIPTION OF THE PREFERRED EMBODIMENT

The invention is disclosed as being embodied preferably in a 35 mm film cartridge. Because the features of this type of film cartridge are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
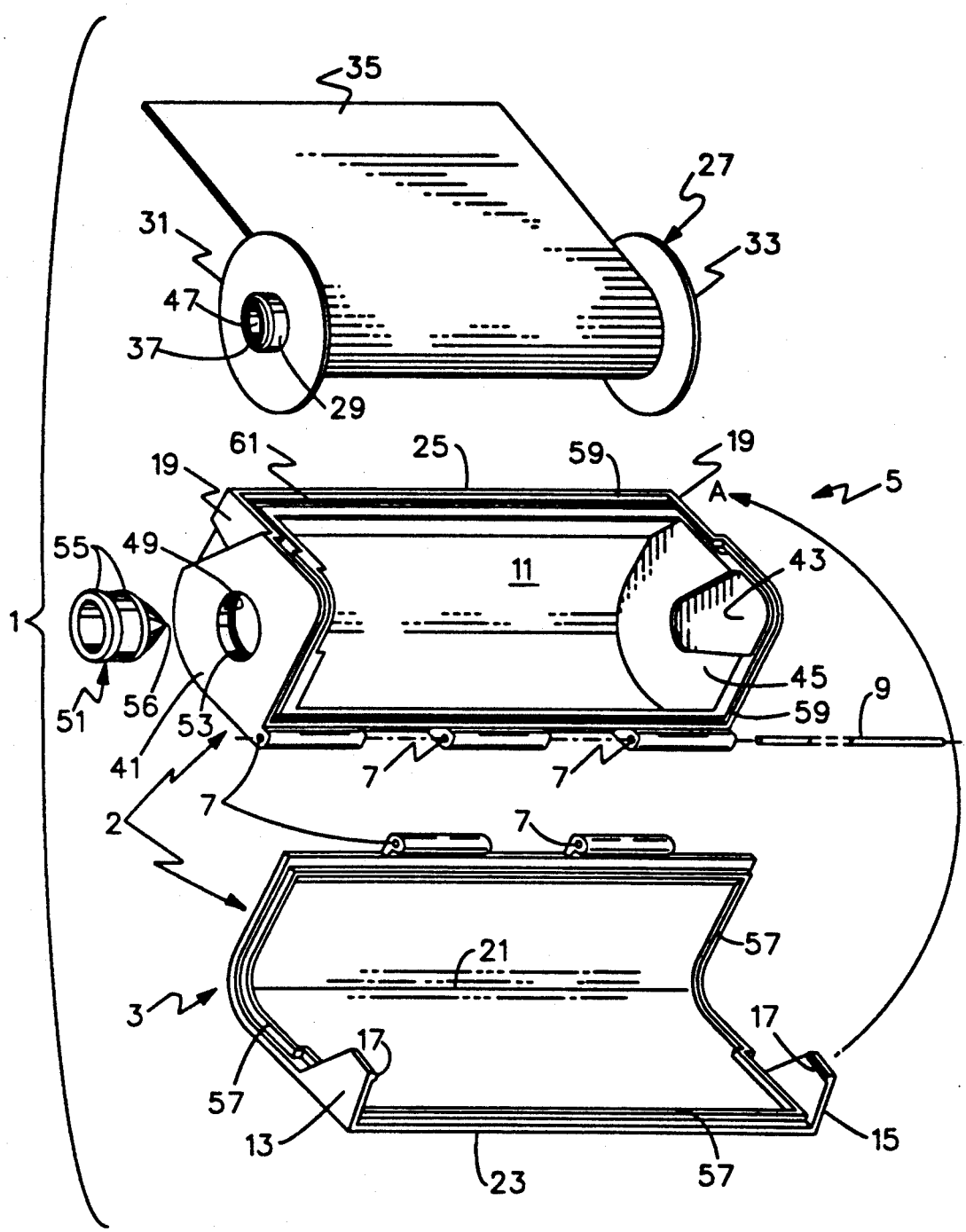
FIG. 1 is an exploded perspective view of a film cartridge.

Referring now to the drawings, FIG. 1 shows a 35 mm film cartridge 1 having a cartridge housing 2 made of plastic material and comprising a pair of shell halves 3 and 5. Several coaxial holes 7 in the two shell halves receive a pivot pin 9 to connect the shell halves. When the shell halves 3 and 5 are joined or folded together as indicated by the arrow A, they enclose a film chamber 11.

The shell halve 3 includes an integral pair of latches or lugs 13 and 15, each one of which has an inwardly facing lip 17. See FIG. 1. The respective lips 17 are shaped to releasably engage corresponding projections 19 on the shell halve 5 to hold the cartridge housing 2 closed. A line of weakness or crease-line 21 is cut on the inside of the shell halve 3 to effect an integral hinge which permits a certain portion of the shell halve between the crease-line and one end edge 23 of the shell halve to be easily lifted at that end edge slightly from an opposite end edge 25 of the shell halve 5, to allow film movement into and out of the film chamber 11. This is similar somewhat to the arrangement shown in prior art U.S. Pat. No. 4,962,401, issued Oct. 9, 1990. Alternatively, a door or pivotal lid can be provided as shown in prior art U.S. Pat. No. 3,631,971, issued Jan. 4, 1972.

A film spool 27 has a hub or core 29 with a pair of integral flanges 31 and 33. A 35 mm filmstrip 35 is wound on the hub 29 between the two flanges 31 and 33. See FIGS. 1 and 2. One end portion 37 of the hub 29 is seated in a recess 39 in an end wall 41 of the shell halve 5 and another end portion, not shown, of the hub is seated in a recess 43 in an end wall 45 of the shell halve to support the film spool 27 for rotation in film winding and unwinding directions.

Figure 2:
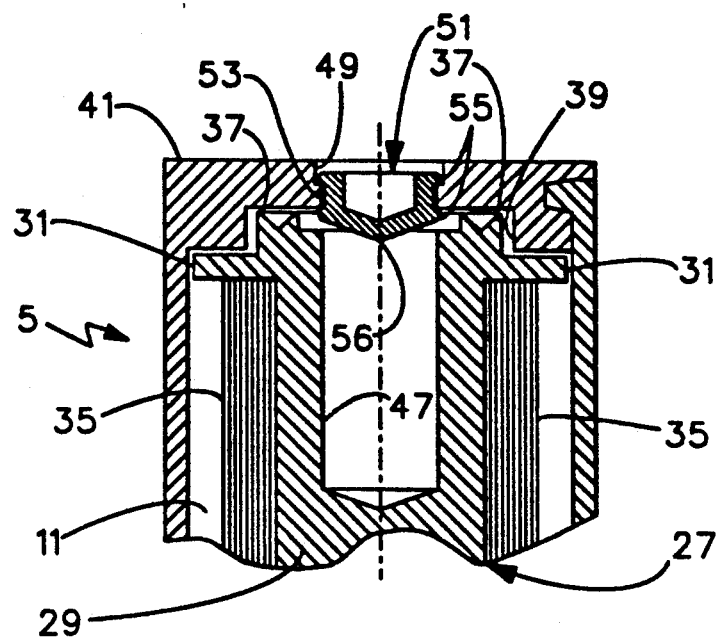
FIGS. 2 and 3 are sectional views of an airtight seal-/use indicator for the film cartridge according to a preferred embodiment of the invention, depicting the seal/indicator in respective sealing and indicating positions.
Figure 3:
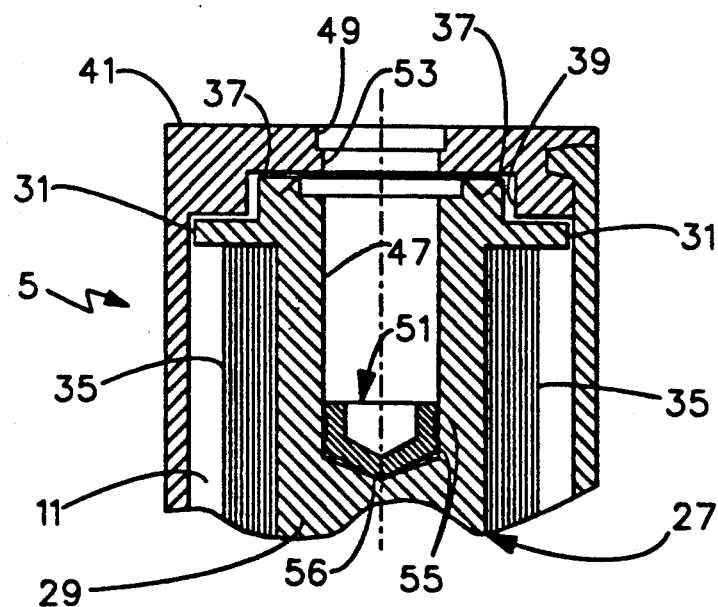

When the film spool 27 is supported inside the shell halve 5, a coaxial cavity 47 in the end portion 37 of the hub 29 is aligned with a hole 49 in the end wall 41 of the shell halve to permit mechanical access to the cavity through the hole. An elastomer hermetic plug 51 is sized to fit tightly in the hole 49 to act as an airtight seal in the hole, but is sufficiently compliant to permit it to be forcibly pushed intact from the hole into the cavity 47 to provide a visible indication that the film cartridge 1 has been used. See FIGS. 2 and 3. Camera means for pushing the plug 51 from the hole 49 into the cavity 47 is shown in prior art U.S. Pat. No. 4,647,170, issued Mar. 3, 1987. A continuous bead 53 of the end wall 41 projects into the hole 49 to be received between a pair of spaced beads 55 of the plug 51 when the plug is in the hole as shown in FIG. 2, to ensure the airtight seal. The plug 51 has a forward tapered end portion 56 which extends partway in the cavity 47 when the plug is in the hole 49, to facilitate movement of the plug into the cavity. See FIG. 2.

A continuous edge of the shell halve 3 includes a coextensive tongue or rib 57 and a continuous edge of the shell halve 5 includes a coextensive groove or channel 59. See FIG. 1. When the shell halves 3 and 5 are joined together as indicated by the arrow A, the tongue 57 is seated in the groove 59. An example of a film cartridge with tongue and groove mating of two shell-like parts is shown in prior art U.S. Pat. No. 4,420,120, issued Dec. 13, 1983. Compliant opaque material, such as a rubber gasket 61, is located in the bottom of the groove 59. The gasket 61 extends completely along the groove 59 to be compressed by the tongue 57 when the tongue is seated in the groove. Alternatively, instead of locating the gasket 61 in the groove 59, a modification of the tongue 57 can include a gasket tip, not shown, which is compressed when it is forced into the groove. In either instance, the gasket 61 or the gasket tip serves as an airtight seal.

The invention has been described with reference to a preferred embodiment. However, it will be appreciated that variations and modifications can be effected within the ordinary skill in the art without departing from the scope of the invention.

We claim:

1. A film cartridge comprising:

a spool hub including an end portion having a coaxial cavity;

a cartridge housing for said spool hub including an end wall having a hole aligned with said cavity to permit access to the cavity through said hole;

a hermetic plug sized to fit tightly in said hole to act as an airtight seal for the hole, but sufficiently compliant to permit it to be forcibly pushed intact from the hole into said cavity to provide a visible indication that said film cartridge has been used.

2. A film cartridge comprising:

a spool hub including an end portion having a coaxial cavity;

a cartridge housing for said spool hub including an end wall having a hole aligned with said cavity to permit access to the cavity through said hole;

a hermetic plug sized to fit tightly in said hole to act as an airtight seal for the hole, but sufficiently compliant to permit it to be forcibly pushed intact from the hole into said cavity to provide a visible indication that said film cartridge has been used; and respective engagement means located on said end wall and said plug for mutually engaging when the plug is in said hole to ensure the airtight seal and for disengaging in response to pushing the plug from the hole into said cavity.

3. A film cartridge as recited in claim 2, wherein said plug has a forward tapered end portion which extends into said cavity when the plug is in said hole.

4. A film cartridge as recited in claim 2, wherein said plug is an elastomer.

* * * * *